May 13, 1941.     I. P. JOHNSON     2,242,131
GAUGE
Filed Nov. 1, 1939     2 Sheets-Sheet 1

Ira P. Johnson
INVENTOR
BY Victor J. Evans & Co.
ATTORNEYS

May 13, 1941.  I. P. JOHNSON  2,242,131
GAUGE
Filed Nov. 1, 1939   2 Sheets-Sheet 2
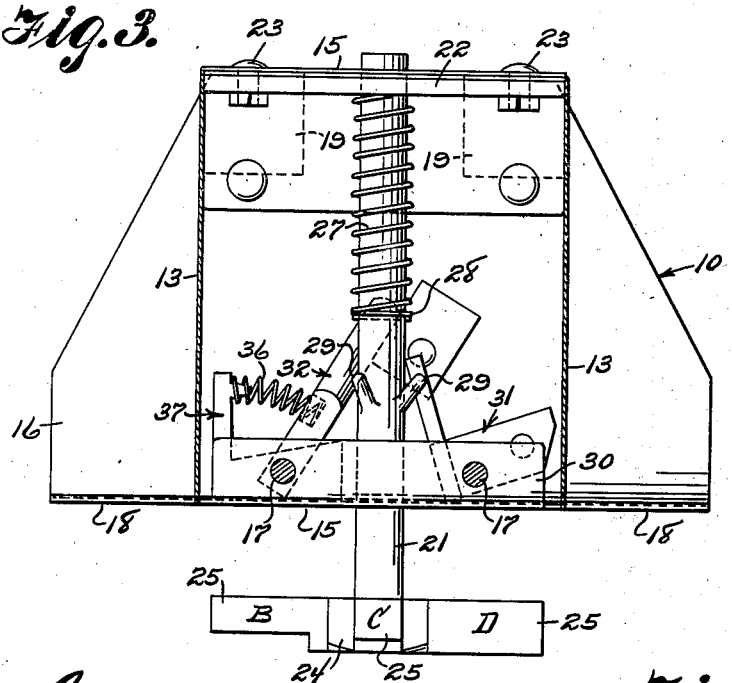
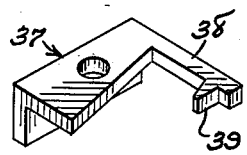
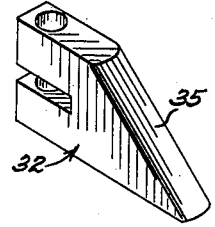
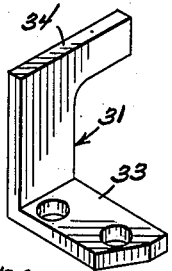
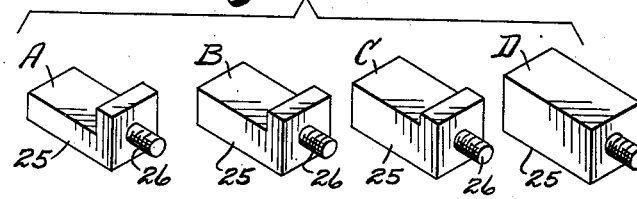
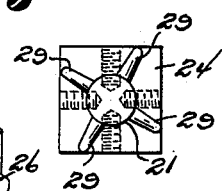
Ira P. Johnson INVENTOR
BY Victor J. Evans & Co.
ATTORNEYS Patented May 13, 1941

2,242,131

UNITED STATES PATENT OFFICE 2,242,131

GAUGE

Ira P. Johnson, Melrose, N. Mex.

Application November 1, 1939, Serial No. 302,418

5 Claims. (Cl. 33—168)

The present invention relates to new and improved gauges and more particularly to an automatic gauge to be used in testing the adjustment of switch shunt boxes and power switches in railway signalling.

The primary object of the invention resides in the provision of an automatic gauge that permits accurate adjustment of a railway switch without the necessity of manually changing the gauge upon each opening and closing of the switch during the testing operation.

The invention will be fully and comprehensively understood from a consideration of the following detailed description when read in connection with the accompanying drawings which form a part of the application.

In the drawings:

Figure 3 is a longitudinal sectional view taken substantially on line 3—3 of Figure 2.

Figures 4, 5 and 6 are detail perspective views of parts of the gauge being removed therefrom.

Figure 7 is an end view of the shaft shown in Figure 3, the same being removed from its housing, and Figure 8 is a perspective view of different-sized gauges employed with the device.

Figure 1:
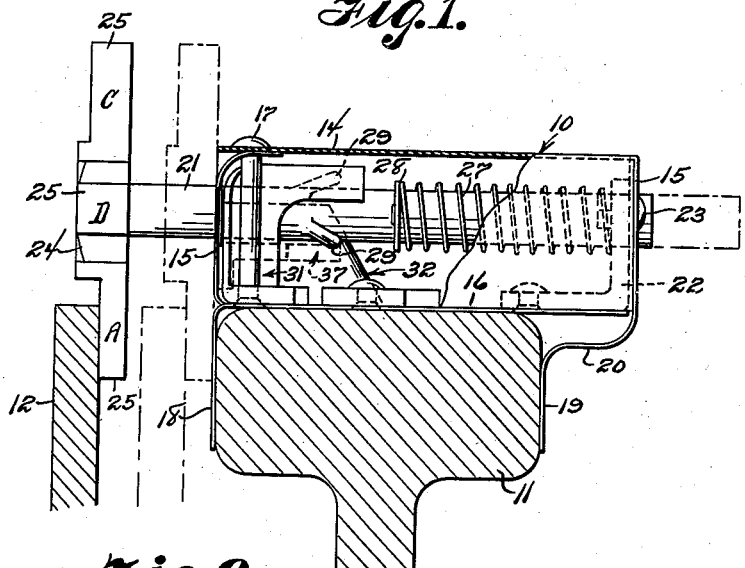
Figure 1 is a side elevational view with parts in section illustrating the gauge in use.
Figure 2:
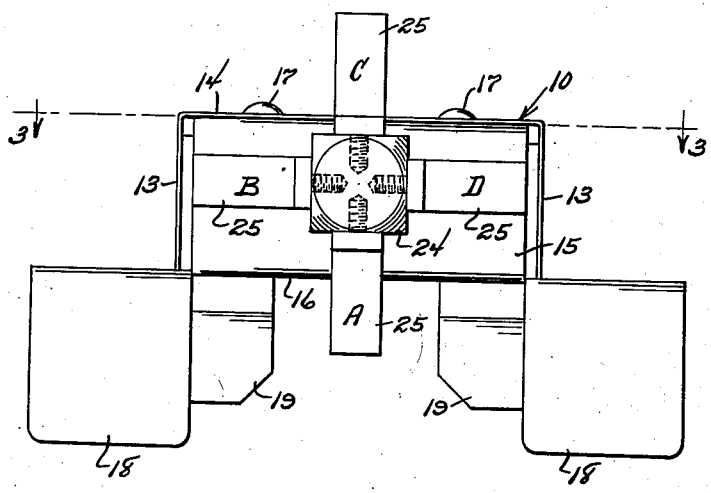
Figure 2 is an end elevational view thereof.

Referring to the drawings for a more detailed description thereof the automatic gauge generally designated by the reference numeral 10 is shown in Figure 1 of the drawings as being disposed upon a main rail 11 with which it is used for testing the switch point 12. The gauge 10 comprises a substantially rectangular-shaped housing including integral side and top walls 13 and 14 respectively, and end and bottom walls 15 and 16 respectively also of integral formation, the same being of sheet steel or similar material and held in assembled relation by bolts or similar fastening means 17. The casing is adapted to be frictionally held on the rail 11 by means of the clamps 18 and 19 respectively, said clamps depending from and forming a part of the end and bottom walls 15 and 16 of the housing. Referring more particularly to Figure 1 of the drawings, it will be noted that the gauge 10 projects beyond one side edge of the rail 11 and to accommodate the same the clamps 19 are angularly bent as indicated at 20.

A shaft 21 extends longitudinally through the housing 10 having a bearing member 22 at one end of said housing through which it projects, said member being bolted or otherwise secured to the end wall of the housing by means 23. The opposite end of the shaft 21 which projects beyond the end of the casing has mounted thereon a substantially square-shaped hub 24 to which is attached a series of gauging elements 25. As more particularly shown in Figure 8 of the drawings, the gauging elements 25 are of varying thickness and are each provided with a threaded stem 26 for attaching said elements to the hub 24. For purposes of identification the gauges 25 are lettered A, B, C and D, gauge A being of the minimum thickness and the other gauges increasing proportionately. It will be noted that the gauge elements 25 have a cut out portion for fitting against the switch rail 12 as shown in Figure 1 of the drawings.

The switch to be tested is opened approximately ½ way and the housing is placed on the rail 11 in the manner shown in Figure 1 and is approximately 6 inches back from the end of the switch point with the gauge carrying end of the shaft projecting from the housing and with the first gauge A to be used, pointed downwardly. The switch is then closed to test the adjustment of the switch box relative to gauge A. For example, facing point of switch signals at stop position on ¼ inch and clear on $\frac{3}{16}$ inch. Trailing point of switch signals at stop position on ⅜ inch and clear on $\frac{5}{16}$ inch. As is well known the switch box from where the adjustment is made is usually at a point removed from the switch and adjacent the stand from which the switch is operated. In the event that gauge A does not give an accurate test, the closing of the switch will force the rail 12 against the rail 11 to effect a partial rotation of the shaft 21 to position gauge B, the same being effected in the following manner.

A tension spring 27 is mounted on the shaft 21 and has one end abutting the bearing member 22 and the other end held by means of a fixed collar 28, said spring adapted to be compressed upon movement of the shaft 21 by the closing of the switch. A series of fingers or prongs 29 are formed integral with the shaft 21 and extend at an angle therefrom in front of the spring 27. A steel plate 30 is attached to the forward end of the frame 10 through which the fastening members 17 extend, said members also serving to fixedly hold the stop plate 31 and to pivotally mount the dog 32 on opposed sides of the shaft 21. The stop plate 31 comprises a bottom portion 33 and L-shaped arm 34 against which the prongs 29 are adapted to engage for limiting rotation of the shaft. The dog 32 is formed with an angular portion 35 sloping toward the shaft 21 as more clearly shown in Figure 3 of the drawings. The dog 32 is swung away from the shaft 21 by the prongs 29 when said shaft is pushed inwardly, said dog moving against the coil spring 36 carried by a member 37 also secured by the fastening members 17. Referring more particularly to Figure 4 of the drawings, it will be noted that the member 37 is formed with an arm 38 including a tapered portion 39 on which the spring 36 reposes.

As the switch is closed from the operating stand, the rail 12 is moved against the thickness gauge A causing said gauge to be moved with its shaft 21 against the main line rail 11 thereby giving the distance between the rail and the switch point. As the shaft is pushed inwardly against the tension of the spring 27 one of the prongs 29 will abut against the dog 32 swinging the same outwardly against the tension of its spring 36 so that said prong will then be positioned on the opposite side of the dog 32. When the switch is again opened, the compression spring 27 will urge the shaft 21 toward its normal position, the movement of which allows one of the prongs 29 to travel upwardly along the sloping part 35 of the dog 32 causing the shaft to rotate one-fourth of a turn thereby bringing the next gauge in position for use. As the shaft is rotating its quarter turn, one of the other prongs 29 will be brought into engagement with the arm 34 of the stop 31 thereby preventing further rotation of the shaft 21. Thus it will be seen that thickness gauges 25 of various dimensions can be brought into place between the main rail 11 and the switch point 12 upon the opening and closing of the switch and that the assembled gauge does not require the attention of the workman after its installation upon the main rail.

The thickness gauges 25 are readily interchangeable since the block 24 is formed with internally threaded recesses for receiving the threaded ends 26 of said gauges. It is preferred, however, that the gauges be graduated in size with the thinner gauge used first and the succeeding gauges being of a gradual thicker dimension.

Also it will be understood, of course, by those skilled in the art that variations in the hereinabove described device involving the substitution of substantial equivalents for the devices described are intended to be comprehended within the spirit of the present invention and that the invention is capable of extended application and is not confined to the exact showing of the drawings nor to the precise construction described and, therefore, such changes and modifications may be made therein as do not affect the spirit of the invention nor exceed the scope thereof as expressed in the appended claims.

What is claimed is:

1. An automatic railway switch testing device comprising, a frame, means for supporting said frame on a rail, a shaft slidably and rotatably mounted within said frame, and a plurality of gauge elements connected with said shaft for movement therewith as a unit to be successively brought into position upon movement of said shaft.

2. An automatic railway switch testing device comprising, a frame, means for supporting said frame on a rail, a shaft slidably and rotatably mounted within said frame and projecting beyond one end thereof, a plurality of gauge elements connected with said projected end for movement with said shaft as a unit, and means for rotating said shaft to bring successive gauge elements into gauging position through reciprocation of the shaft.

3. An automatic railway switch testing device comprising, a substantially rectangular-shaped frame adapted to be supported upon a main rail, a shaft rotatably and slidably disposed within said frame, a compression spring surrounding said shaft and having one end attached thereto with its other end abutting said frame, said shaft adapted to be moved lengthwise against the tension of said spring when contacted by the switch rail, and a plurality of gauge elements connected with said shaft for movement therewith as a unit adapted to be successively brought into position upon rotation of the shaft through lengthwise movement thereof against the tension of said spring.

4. An automatic railway switch testing device comprising, a substantially rectangular shaped frame adapted to be supported upon the main rail, a shaft rotatably and slidably mounted within said frame, a compression spring surrounding said shaft and having one end attached thereto with its other end abutting said frame, said shaft adapted to be moved lengthwise against the tension of said spring, a series of diverging prongs formed in spaced relation on said shaft, a plate attached to the front end of said frame, a dog pivotally attached to said plate on one side of said shaft, a stop member pivotally attached to said plate on the other side of said shaft, said prongs adapted to engage said dog to effect partial rotation of said shaft upon slidable movement thereof, said stop member being contacted by said prongs to limit rotation of said shaft, and a plurality of gauge elements connected with said shaft for movement therewith as a unit and adapted to be successively brought into position upon rotation of the shaft.

5. A device for gauging the relative distance between a switch point and a rail comprising a frame, means for supporting said frame on a rail, a shaft slidably and rotatably mounted within said frame, a plurality of gauge elements connected with said shaft for movement therewith as a unit to be successively brought into position upon rotation of said shaft, said gauges being positioned between the rail and switch point, and means on said shaft for effecting partial rotation thereof upon the closing of the switch point against the gauge elements.

IRA P. JOHNSON.